(12) United States Patent
Erickson et al.

(10) Patent No.: US 7,311,478 B2
(45) Date of Patent: Dec. 25, 2007

(54) TOOLHOLDER

(75) Inventors: Robert A. Erickson, Raleigh, NC (US); Linn R. Andras, Ligonier, PA (US)

(73) Assignee: Kennametal Inc., Latrobe, PA (US)

( * ) Notice: Subject to any disclaimer, the term of this patent is extended or adjusted under 35 U.S.C. 154(b) by 51 days.

(21) Appl. No.: 10/526,414

(22) PCT Filed: Sep. 2, 2003

(86) PCT No.: PCT/US03/27218

§ 371 (c)(1),
(2), (4) Date: Nov. 14, 2005

(87) PCT Pub. No.: WO2004/022288

PCT Pub. Date: Mar. 18, 2004

(65) Prior Publication Data

US 2006/0104728 A1   May 18, 2006

Related U.S. Application Data

(60) Provisional application No. 60/407,727, filed on Sep. 3, 2002.

(51) Int. Cl.
*B23C 5/00* (2006.01)
(52) U.S. Cl. .......................................... 407/48; 407/46

(58) Field of Classification Search .................. 407/46, 407/67, 66, 101, 48
See application file for complete search history.

(56) References Cited

U.S. PATENT DOCUMENTS

| | | | | | |
|---|---|---|---|---|---|
| 3,078,547 | A | * | 2/1963 | Sweet | 407/71 |
| 3,701,187 | A | * | 10/1972 | Erkfritz | 407/46 |
| 5,395,186 | A | * | 3/1995 | Qvart | 407/46 |
| 5,704,736 | A | * | 1/1998 | Giannetti | 407/35 |
| 5,873,682 | A | * | 2/1999 | Tripsa | 407/101 |

* cited by examiner

*Primary Examiner*—Willmon Fridie, Jr.
(74) *Attorney, Agent, or Firm*—Larry R. Meenan

(57) ABSTRACT

A tool holder (20) comprises a body portion (32), a support member assembly (33) mounted to the body portion and an insert-receiving cartridge (36) removably received in the support member. The insert-receiving cartridge (36) includes a pocket (38) for mounting a cutting insert (40) thereon. The support member assembly (33) includes a bore and the insert-receiving cartridge (36) includes a shank capable of being received in the bore. The combination of the insert-receiving cartridge (36) and the cutting insert (40) forms a cutting tool for a particular cutting operation. In one embodiment, the cutting tools are radially mounted to a side periphery of the body portion (32) such that the vertical axis of the cutting tool is substantially parallel to the longitudinal axis (L) of the toolholder (20).

18 Claims, 22 Drawing Sheets

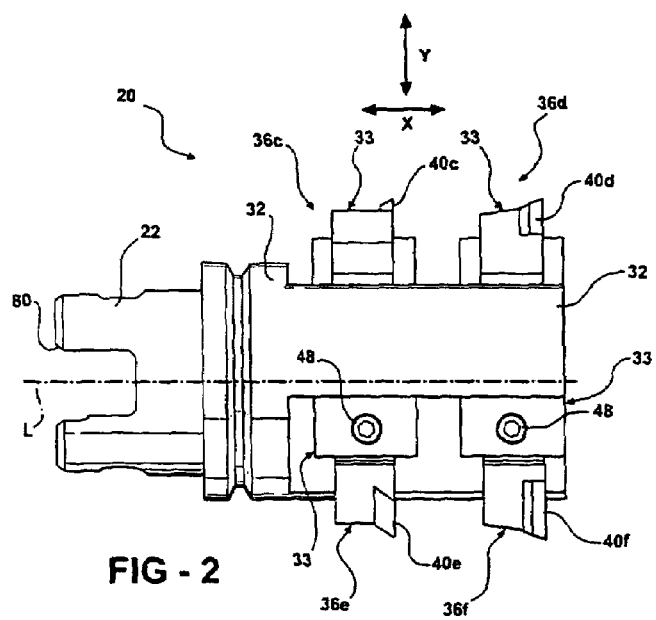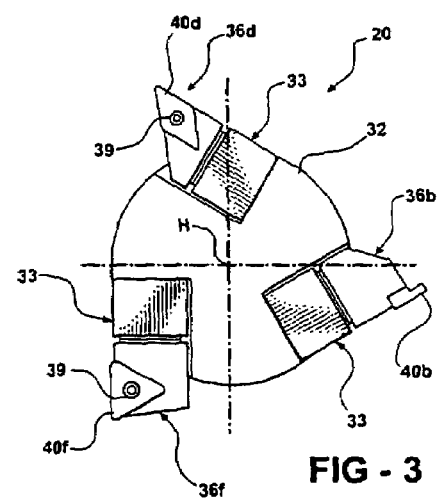

TOOLHOLDER

CROSS-NOTING TO RELATED APPLICATIONS

This application is related to U.S. Provisional Patent Application Ser. No. 60/407,727, entitled "Quick Change Toolholder", filed on Sep. 3, 2002, the entire contents of which are incorporated herein by reference.

BACKGROUND OF THE INVENTION

1. Field of the Invention

This invention relates to a toolholder. The toolholder includes a body portion having a plurality of cutting inserts wherein the toolholder is capable of being fixed in a plurality of static positions during a machining operation of a rotating workpiece to individually present each cutting insert to the rotating workpiece during the machining operation. In one embodiment, the toolholder includes a quick change feature and a radially mounted tool configuration for use with a machine tool with Y-axis movement. In another embodiment, the toolholder includes a quick change feature and a horizontally mounted tool configuration for use with a machine tool with X-axis and Z-axis movements. In yet another embodiment, the toolholder includes a body portion including a plurality of cutting inserts wherein the toolholder is capable of being fixed in a plurality of static positions during a machining operation of a rotating workpiece by rotation and translation at least in a Y axis movement of the machine tool.

2. Description of the Related Art

Currently, milling/turning tool machines with Y-axis capability (above and below the centerline of the workpiece) are available to perform rotary machining (milling, drilling, and the like) on the side of a workpiece held in a chuck of the machine. Minimizing the downtime of a machine tool in a production environment is critical to the success of a manufacturing facility.

Historically, one major contributor to such downtime was the time needed to change damaged or worn out cutting tools used by the machine tool. A cutting tool is held by a toolholder, which is typically mounted within a tool support member secured to a machine tool. When the cutting tool must be replaced, there is a need to place the machine tool in a tool changing position to change out the cutting tool, thereby increasing the downtime.

In addition, traditional tool machines for turning operations in the X and Z axes with a fixed tool configuration are required to purchase the main toolholder body for each configuration. The cost is considerable when purchasing a fixed tool configuration for every possible desired configuration. In addition, the entire toolholder body in the fixed tool configuration has to be replaced or repaired in the event of a crash that leads to breakage of the toolholder and/or cutting insert.

In accordance with one aspect of the present invention, the inventor of the present invention has recognized the need to reduce the downtime in tool machines and has developed a toolholder designed to be used with a milling/turning tool machine, and in particular with a tool machine with Y-axis capability, that will provide multiple tool configurations with one tool change, thereby minimizing downtime.

In addition, the inventor of the present invention has recognized the need to provide a flexible tool configuration in a turning tool machines with movement in the X and Z axes that reduces the costs associated with purchasing a separate toolholder body for each desirable tool configuration.

SUMMARY OF THE INVENTION

Briefly, according to this invention, there is provided a toolholder including a body portion having a plurality of cutting inserts wherein the toolholder is capable of being fixed in a plurality of static positions during a machining operation of a rotating workpiece to individually present each cutting insert to the rotating workpiece during the machining operation.

In one embodiment, the toolholder includes a quick change feature and a radially mounted tool configuration for use with a machine tool with Y-axis movement.

In another embodiment, the toolholder includes a quick change feature and a horizontally mounted tool configuration for use with a machine tool with X-axis and Z-axis movements.

The toolholder may include a body portion, support member assemblies mounted to the body portion and each including a bore, and an insert-receiving cartridge including a shank capable of being removably received in the bore of each support member assembly by an actuator bolt and an actuator nut, the insert-receiving cartridge including a pocket for receiving a cutting insert, wherein rotation of the actuator bolt causes the insert-receiving cartridge to be secured to or removed from the support member.

In yet another embodiment, the toolholder includes a tool configuration for use with a machine tool with rotational and translational movement at least in a Y axis movement of the machine tool.

The toolholder may include a body portion, and optional support member assemblies and insert-receiving cartridges. The inserts may mounted on the insert-receiving cartridges secured within the bore of each support member assembly using most any suitable fastener assembly or within a bore formed within the body portion or mounted within pockets formed integral within the body portion. In a preferred embodiment, the cartridge is secured within a bore by an actuator bolt and an actuator nut, wherein rotation of the actuator bolt causes the insert-receiving cartridge to be secured to or removed from the support member assembly.

A first cutting tool is formed by one of the plurality of cutting inserts mounted on one of the plurality of insert-receiving cartridges, the first cutting tool engaging a workpiece, and a second cutting tool is formed by a different one of the plurality of cutting inserts mounted on a different one of the plurality of insert-receiving cartridges. The second cutting tool is capable of engaging the workpiece by rotating the toolholder about a longitudinal axis of the toolholder or in an alternate embodiment, by rotation and translation at least in an axis perpendicular to a normal cutting plane of the machine tool.

BRIEF DESCRIPTION OF THE DRAWINGS

Further features of the present invention, as well as the advantages derived therefrom, will become clear from the following detailed description made with reference to the drawings in which:

FIG. 2 shows a side view of the toolholder of FIG. 1;

FIG. 3 shows an end view of the toolholder of FIG. 1;

DESCRIPTION OF THE PREFERRED EMBODIMENT

Figure 21:
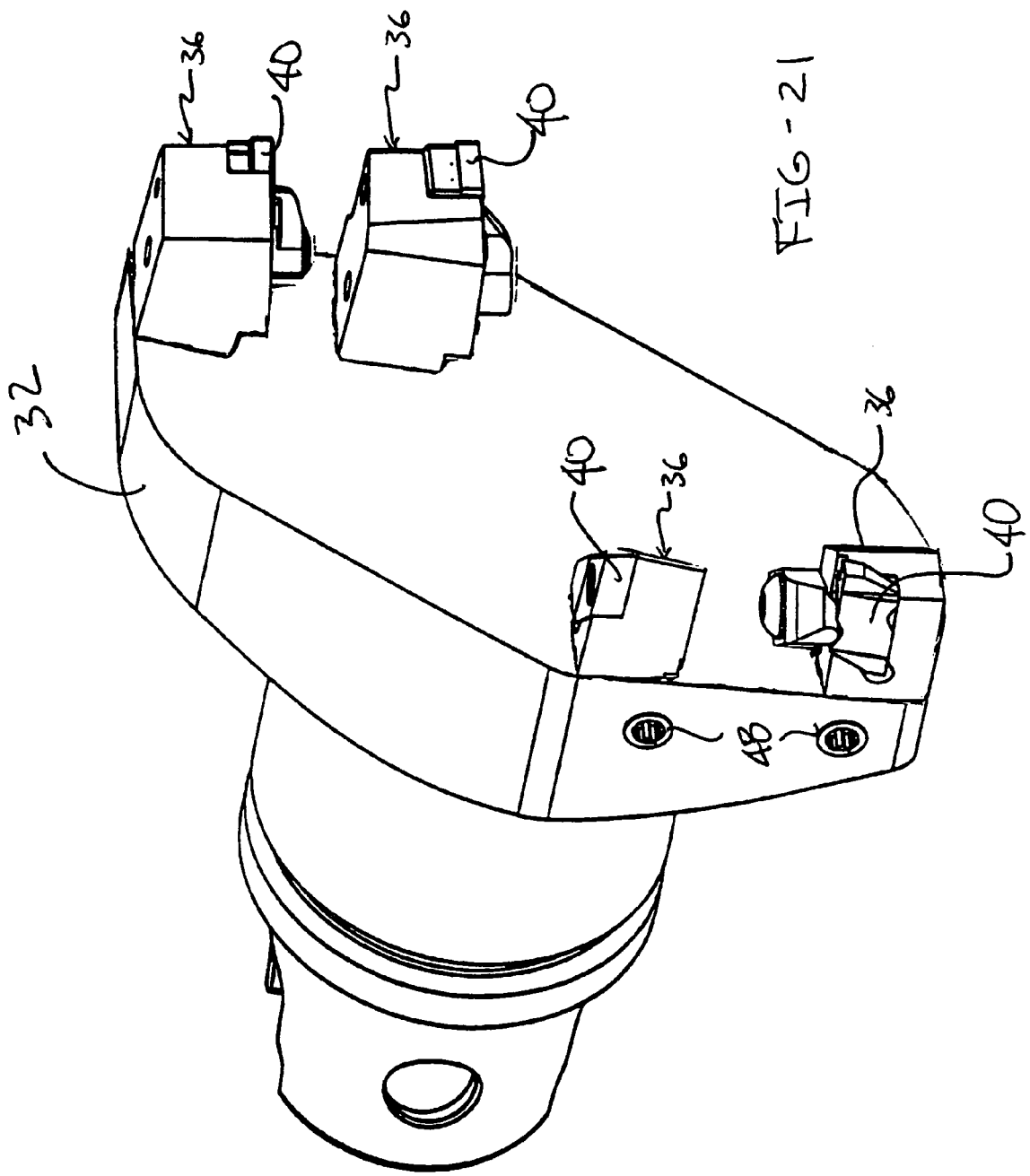
FIG. 21 shows a perspective view of a toolholder according to an alternate embodiment of the invention.
Figure 22:
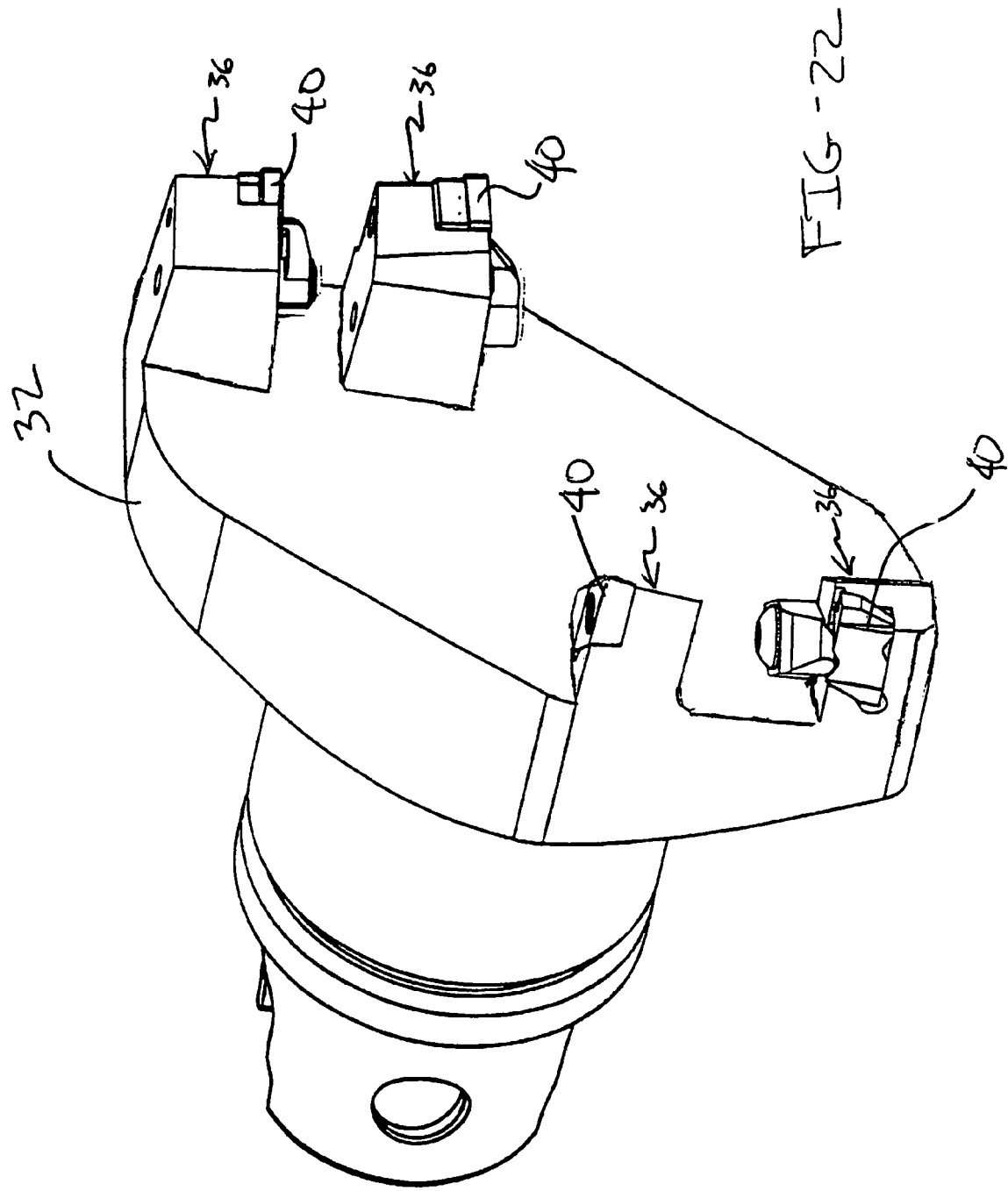
FIG. 22 shows a perspective view of a toolholder according to an alternate embodiment of the invention.
Figure 23:
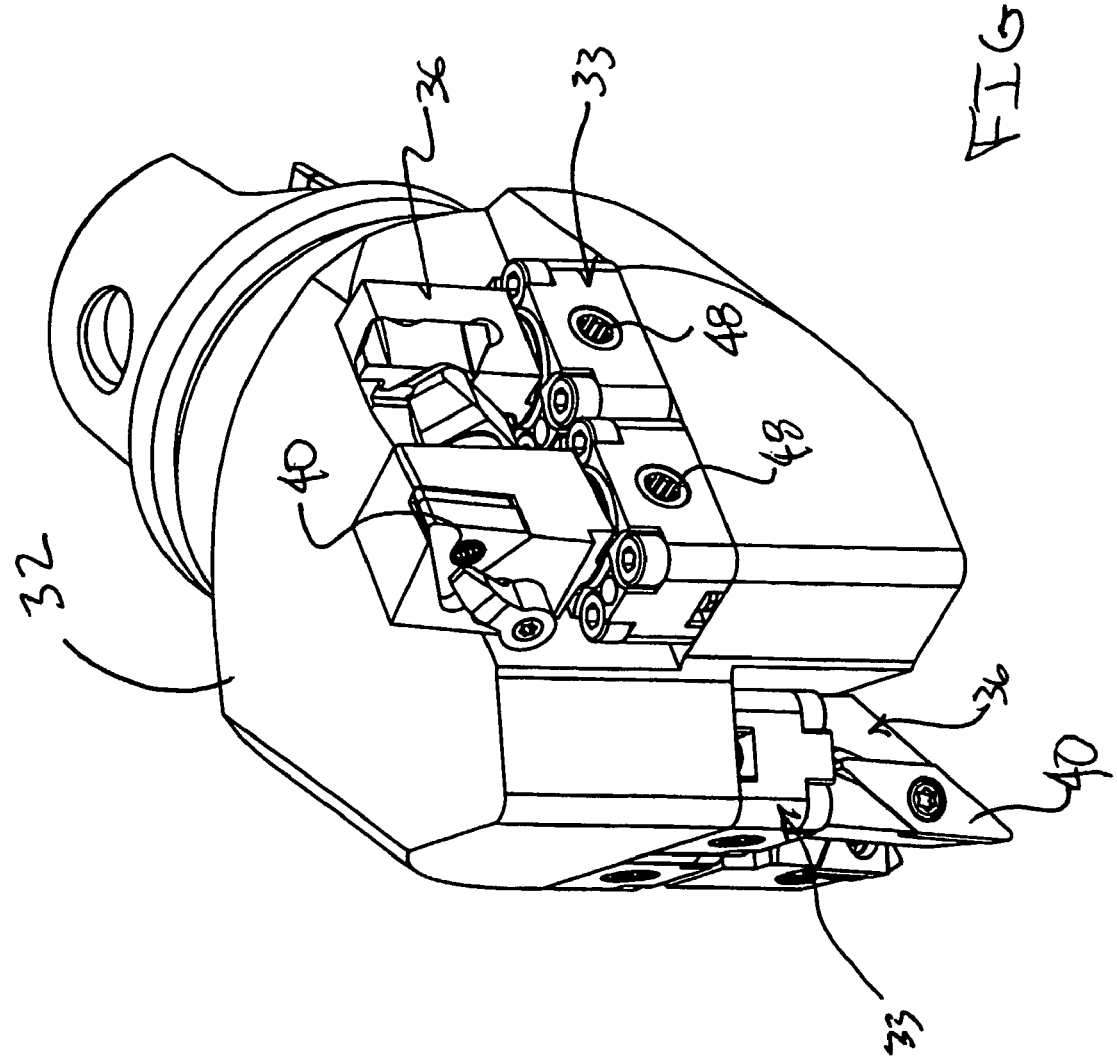
FIG. 23 shows a perspective view of a toolholder according to an alternate embodiment of the invention.

Referring now to the figures wherein like reference numerals refer to like or corresponding elements, a toolholder 20 is shown according to the invention. The toolholder 20 includes a body portion 32 having a plurality of pockets 38, each pocket having retained therein a cutting insert 40. It will be appreciated that the pockets 38 may be formed within an insert-receiving cartridge adapted to be secured within a support member assembly 33 as shown in FIGS. 1-20 and 23-25 or within a bore formed within the body portion and secured using a suitable fastener FIG. 21 or the pockets may be formed integral with the body portion 32 as shown in FIG. 22 using tool manufacturing techniques well known in the art.

The toolholder 20 includes a shank 22 that can be releasably secured to a spindle clamping unit 23 of a machine tool (FIG. 5) as described in U.S. Pat. No. 6,415,696, the entire contents of which are incorporated herein by reference. However, the invention is not limited by the means in which the toolholder 20 is secured to the clamping unit 23, and the toolholder 20 can be secured using any well-known means in the art.

As shown in FIGS. 1-5, the support member assembly 33 is operatively connected to the body portion. Each support member assembly 33 includes a bore 34 for receiving an insert-receiving cartridge, shown generally at 36 a-f. The support member assemblies 33 can be substantially identical in shape, or they each can be a different shape. The bores 34 are formed within the support member 33 and project from the body portion 32 and are substantially perpendicular to a longitudinal axis, L, which extends along the X-axis of the toolholder 20.

Figure 1:
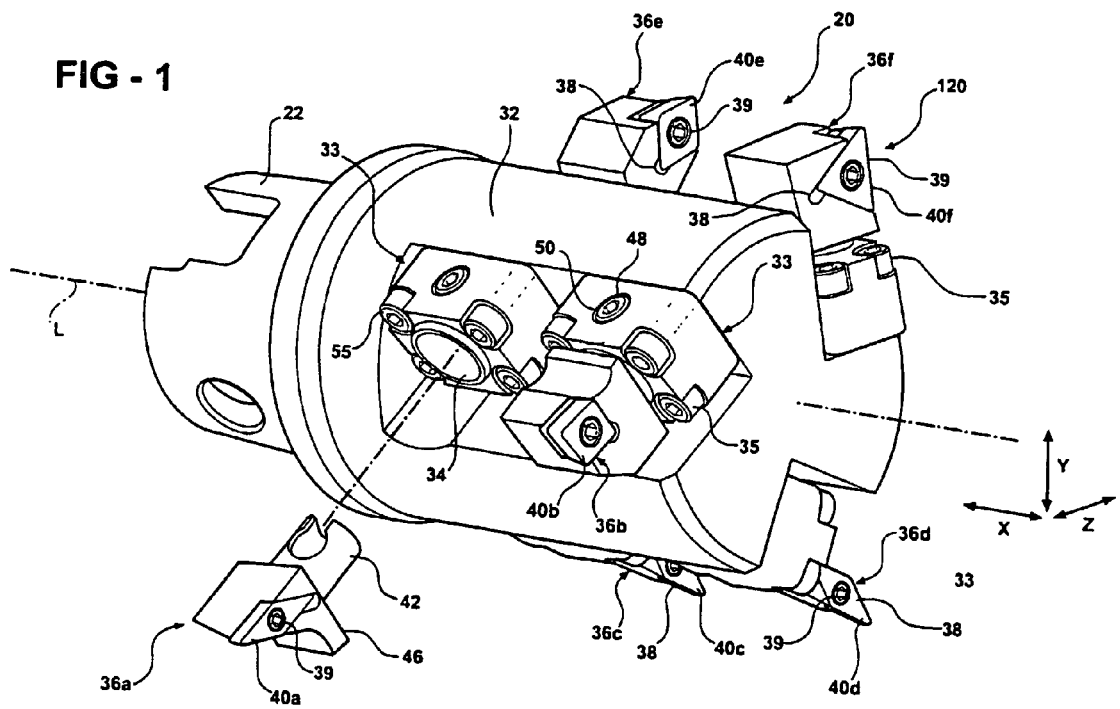
FIG. 1 shows a perspective view of a toolholder according to one embodiment of the invention.

In the illustrated embodiment shown in FIG. 1, the toolholder 20 includes a total of six support member assemblies 33 mounted on the periphery or outer surface of the body portion 32 for receiving a corresponding number of insert-receiving cartridges 36 a-f. However, it will be appreciated that the invention is not limited by the number of support member assemblies 33 and insert-receiving cartridges 36 a-f, and that the invention can be practiced with any desirable number of supporting elements and insert-receiving cartridges, with the only limitation being the dimensions of the body portion 32 of the toolholder 20. Each insert-receiving cartridge 36 a-f includes a pocket 38 for securely holding an insert 40 a-f to its respective insert-receiving cartridge 36 a-f by a suitable fastening means 39, such as a threaded fastener.

As shown in FIGS. 1-21, the cartridge may be secured to the body portion 33 using a quick change feature such as shown and described in U.S. Pat. No. 6,270,293, incorporated herein by reference. Using the quick change feature as shown in U.S. Pat. No. 6,270,293 it will be appreciated that the insert-receiving cartridges 36 a-f can be quickly and easily removed from the toolholder 20, thereby minimizing downtime when changing a cutting insert 40a-f. Specifically, each insert-receiving cartridge 36a-f includes a shank 42 (only one shank is shown in FIG. 1), which may be tubular with a conical shape. Each insert-receiving cartridge 36 a-f is radially mounted to the body portion 32 by inserting the shank 42 into its respective bore 34. The support member assembly 33 has a facing surface 44 that may be mateable with an opposing abutment surface 46 on the insert-receiving cartridge 36a-f. The surfaces 44, 46 may be, among other shapes, conical or planar, to matingly contact one another.

An actuating bolt 48 is positioned in the body portion 32 along a radial axis R1 (FIG. 1), which is radial and substantially perpendicular to the longitudinal axis L, of the toolholder 20 for locking the insert-receiving cartridge 36a-f into its respective support member assembly 33 or for ejecting the insert-receiving cartridge 36 a-f from its respective support member assembly 33. The actuating bolt 48 is positioned within a passageway 50 extending through the body portion 32 along axis, R1. An actuating nut 60 cooperates with the actuating bolt 48 to allow the insert-cartridge 36a-f to be quickly installed or removed from its respective support member assembly 33. While the shank 42 and the bore 34 of the associated tool support member assembly 33 have been illustrated as tubular, the invention should not be limited to such a shape. The shank 42 and the bore 34 may be any number of different shapes, including cylindrical, square, rectangular, triangular and trochoidal, sufficient to accommodate the actuating bolt 48. Further, the shank 42 may have an interference fit within the bore 34.

As described above, the insert-receiving cartridges 36 a-f securing the inserts 40 a-f can be quickly and easily removed or installed in their respective support member assemblies 33 of the toolholder 20 by rotating the corresponding actuator bolt 48, thereby providing a quick change of the insert tool. In addition, the combination of an individual insert 40a-f and its respective insert-receiving cartridge 36a-f can perform a different machining operation. For example, the combination of the insert 40f and its respective insert-receiving cartridge 36f can form a turning tool, shown generally at 120, for use in a turning operation, as shown in FIG. 4.

Figure 4:
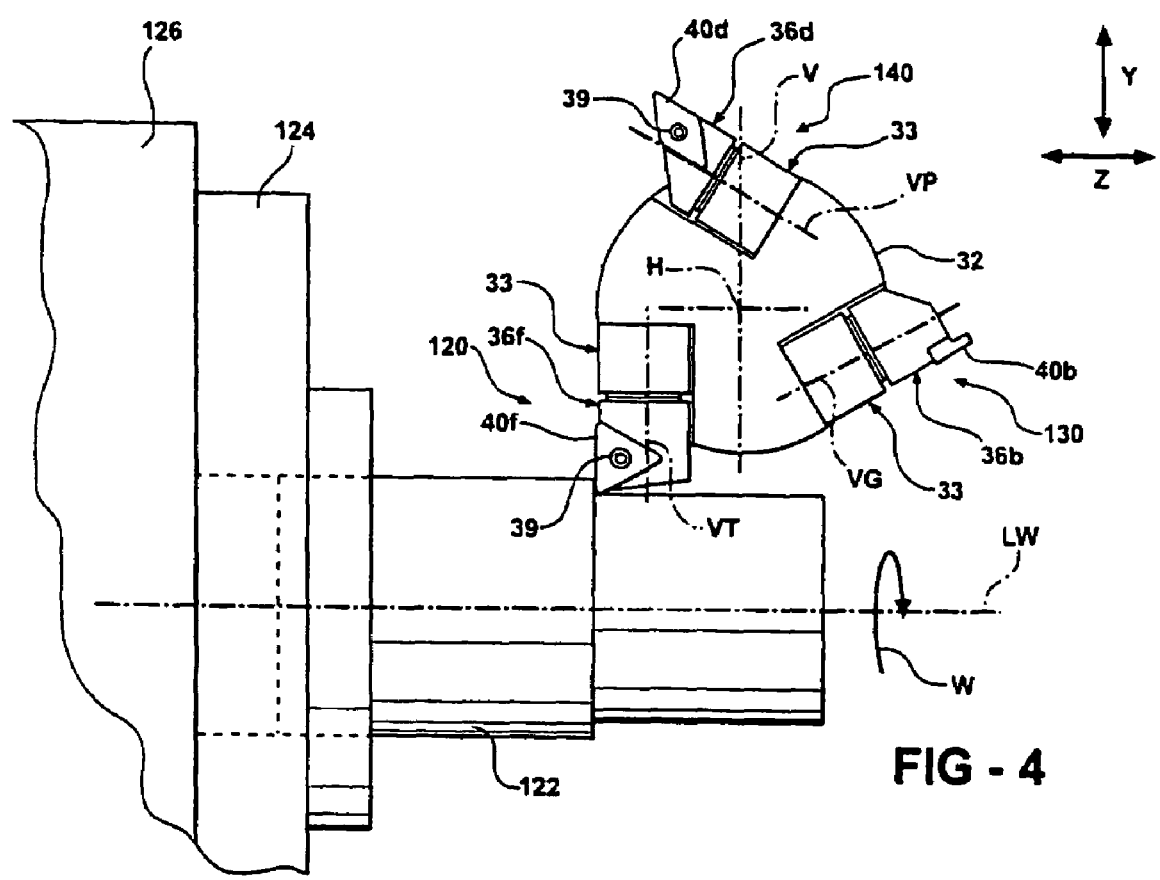
FIG. 4 shows an end view of a toolholder of FIG. 1 performing a turning operation.
Figure 5:
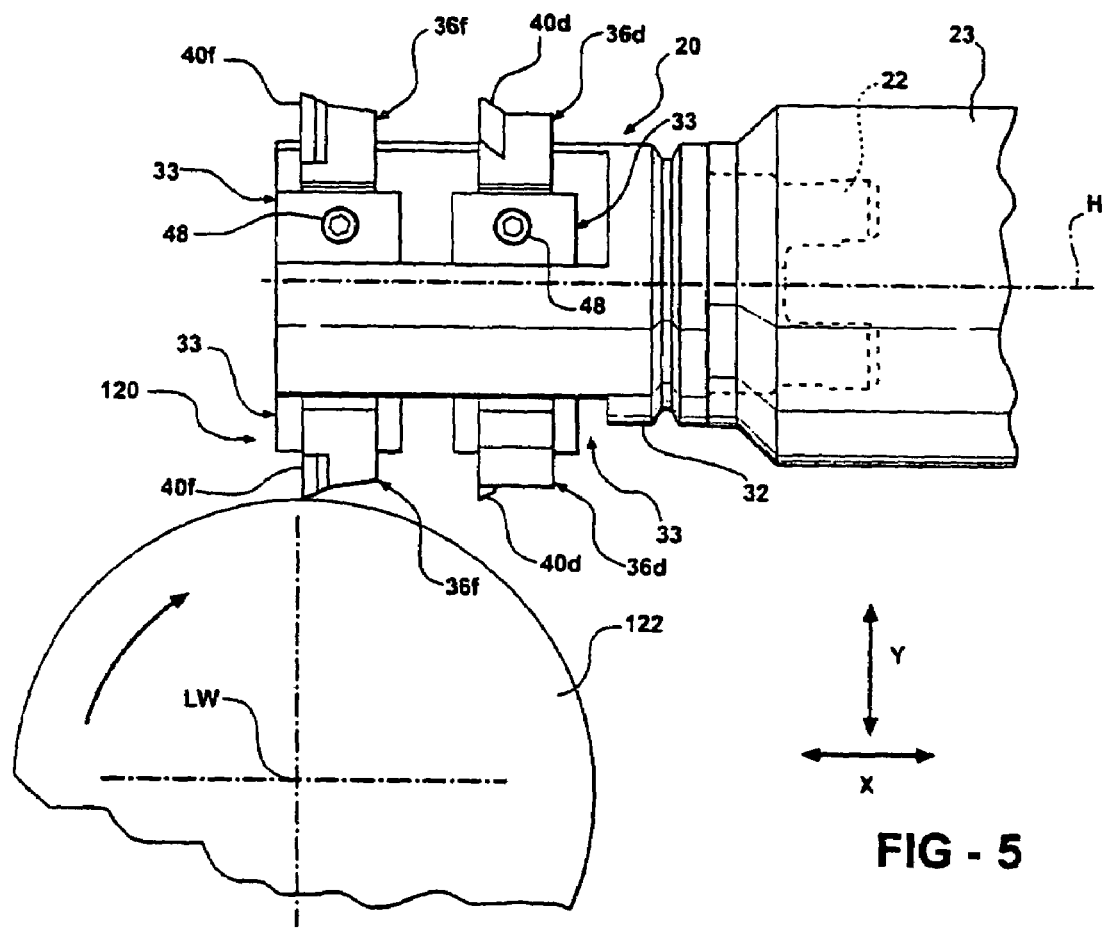
FIG. 5 shows a side view of the toolholder of FIG. 1 performing a turning operation.
Figure 9:
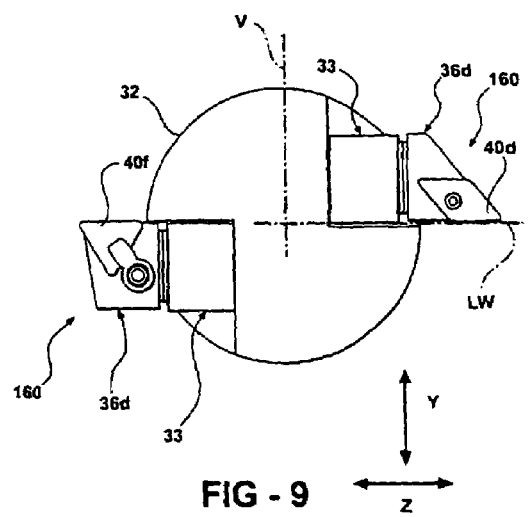
FIG. 9 shows an end view of the toolholder of FIG. 1 with a combination of cutting inserts held in accurate radial orientation.

In the turning operation shown in FIG. 4, a workpiece 122 is mounted in a chuck jaw 124 of a chuck 126 for rotation in the direction, W, in a manner known in the art. As best seen in FIG. 9, the workpiece 122 has a longitudinal axis, LW, along its centerline that is substantially parallel to the horizontal axis, L, in the direction of the X-axis (into the page) of the toolholder 20. In other words, the longitudinal axis, LW, of the workpiece 122 is substantially perpendicular to a vertical axis, V, in the direction of the Y-axis of the toolholder 20. As can be seen in FIGS. 4 and 5, the horizontal axis, L, of the toolholder 20 is not in the same plane as the longitudinal axis, LW, of the workpiece.

As shown in FIG. 4, the vertical axis, VT, of the turning tool 120 is substantially parallel to the vertical axis, V, of the toolholder 20, and thus is substantially perpendicular to the horizontal axis, LW, (into the page) of the workpiece 122 when the turning tool 120 is engaging the workpiece 122 during turning operations. It should also be noted that the direction of cut, as shown by the arrow, is along the Z-axis and is substantially parallel to both the horizontal axis, LW, of the workpiece 122 and the horizontal axis, L, of the toolholder 20. As shown in FIG. 5, the direction of cut is toward the viewer (out of the page).

Figure 6:
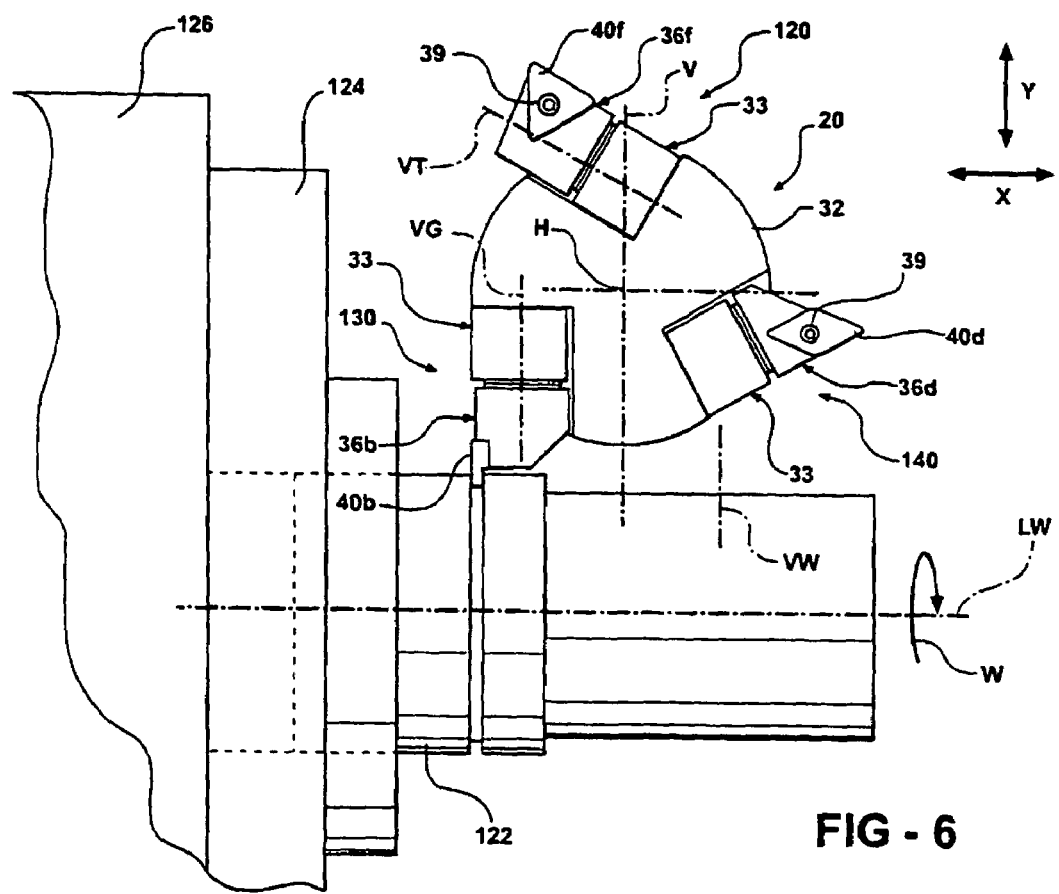
FIG. 6 shows an end view of a toolholder of FIG. 1 performing a grooving operation.
Figure 7:
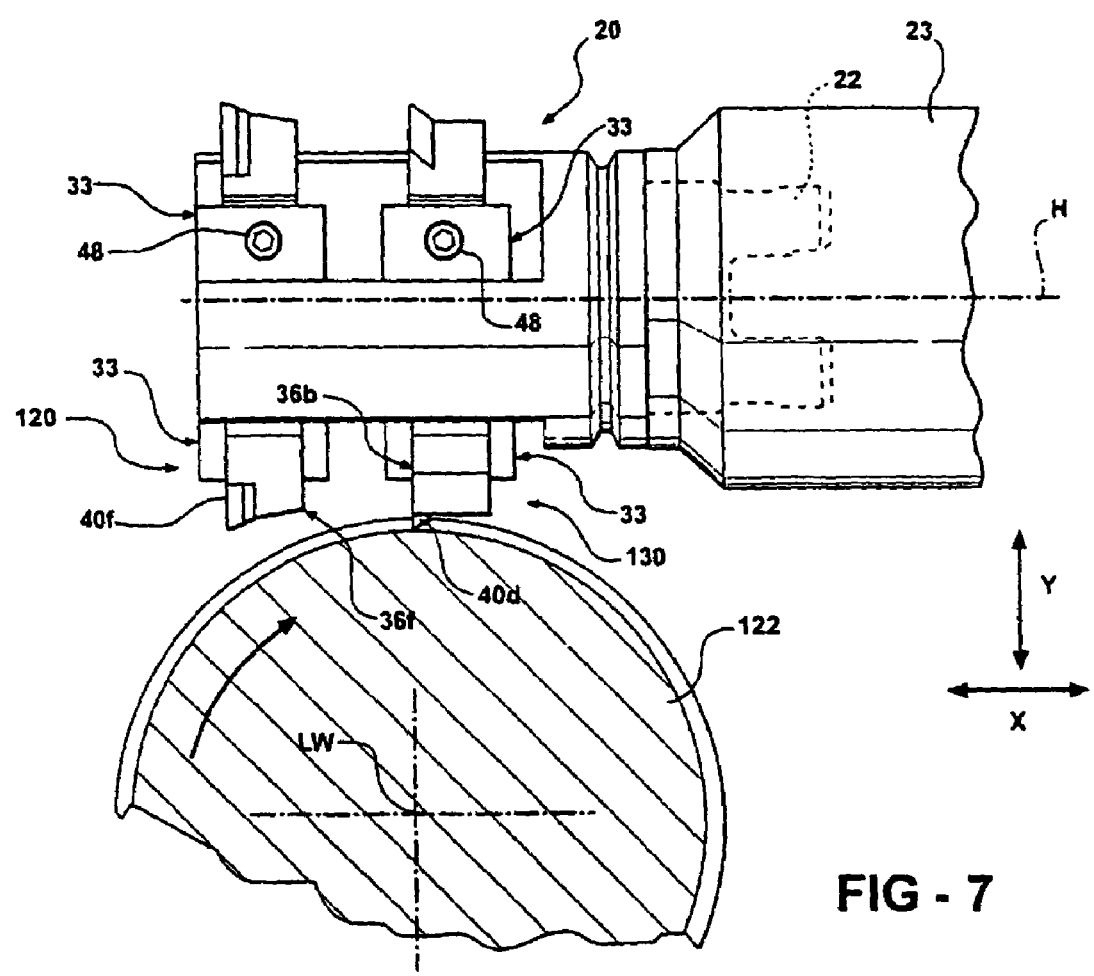
FIG. 7 shows a side view of the toolholder of FIG. 1 performing a grooving operation with a cutaway view of the workpiece.

In another example of the toolholder 20 of the invention, the combination of the insert 40b and its respective insert-receiving cartridge 36b can form a grooving tool, shown generally at 130, for use in a grooving operation, as shown in FIGS. 6 and 7. In the illustrated embodiment of FIG. 6, the grooving tool 130 is positioned as an outer tool distal to the shank 22 of the toolholder 20. However, it will be appreciated that the grooving tool 120 can be positioned as an inner tool proximate to the shank 22 of the toolholder 20, as shown in FIG. 7, or both, depending on the number of cutting tools mounted on the toolholder 20. It should be noted that by rotating the illustrated toolholder 20 of the invention by approximately 120 degrees from the turning operation position shown in FIG. 4, the toolholder 20 of the invention can quickly provide a quick change in a machine tool operation.

In the grooving operation, the workpiece 122 has a longitudinal axis, LW, along its centerline that is substantially parallel to a horizontal axis, L, in the direction of the X-axis (into the page of FIG. 6) of the toolholder 20 during grooving operations. In other words, the longitudinal axis, LW, of the workpiece 122 is substantially perpendicular to a vertical axis, V, in the direction of the Y-axis of the toolholder 20 during grooving operations. As can be seen in FIGS. 6 and 7, the horizontal axis, H, of the toolholder 20 is not in the same plane as the longitudinal axis, LW, of the workpiece.

As shown in FIG. 6, the vertical axis, VG, of the grooving tool 130 is substantially parallel to the vertical axis, V, of the toolholder 20, and thus is substantially perpendicular to the horizontal axis, LW, (into the page) of the workpiece 122 when the grooving tool 130 is engaging the workpiece 122 during grooving operations. It should also be noted that the direction of cut, as shown by the arrow, is along the Y-axis and is substantially parallel to both the vertical axis, VW, of the workpiece 122 and the vertical axis, V, of the toolholder 20. As shown in FIG. 7, the direction of cut, as viewed from the chuck 126, is along the surface of the page.

It should be also noted that the vertical axis, VG, of the grooving tool 130 is substantially parallel to the vertical axis, V, of the toolholder 20, and thus is substantially perpendicular to the horizontal axis, LW, of the workpiece 122 during grooving operations. It should also be noted that the direction of cut, as indicated by the arrow, is along the Y-axis and is substantially parallel to both the horizontal axis, LW, of the workpiece 122 and the horizontal axis, L, of the toolholder 20.

The toolholder 20 is capable of providing a quick change for a wide variety of cutting tools. In another example, the toolholder 20 includes a profiling tool, shown generally at 140 (FIGS. 4 and 6), comprising a combination of the cutting insert 40d mounted on the insert-receiving cartridge 36d. In accordance with the invention, the profiling tool 140 is mounted on the support member assembly 33 to allow a quick change of the machine tool, similar to the other machine tools mounted on the toolholder 20 of the invention. It will be appreciated that the vertical axis, VP, of the profiling tool 140 is substantially parallel to the vertical axis, V, of the toolholder 20, and thus is substantially perpendicular to the horizontal axis, LW, (into the page) of the workpiece 122 during profiling operations, similar to the turning and grooving tools 120, 130.

Figure 8:
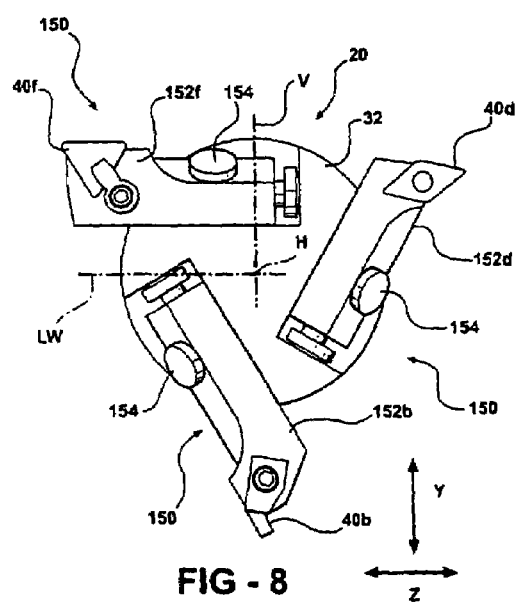
FIG. 8 shows an end view of the toolholder of FIG. 1 with a combination of cutting inserts held in special ANSI/ISO insert-receiving cartridges.

As mentioned above, the machine tool 10 with the toolholder 20 of the invention allows for a wide variety of cutting tools to be mounted thereon. For example, the toolholder 20 of the invention can accommodate the same type of cutting tools as shown in FIGS. 1-7, however the cutting inserts 40a-f are held in special ANSI/ISO insert-receiving cartridges 152a-f to form cutting tools 150, as shown in FIG. 8. In this illustrated example of the invention, the support member assembly 33 are not needed because the insert-receiving cartridges 152a-f are mounted directly to the body portion 32 of the toolholder 20 using a well-known means, such as a threaded fastener 154.

In another illustrated example of the invention shown in FIG. 9, the toolholder 20 can include cutting tools 160 that are radially mounted to the toolholder 20 in such a manner so as to minimize the errors associated with the radial orientation of the chuck jaw 124 and/or the chuck 126 (along the longitudinal axis, LW, of the workpiece). In this embodiment, accurate radial orientation of the cutting tools 160 is achieved so that the machine tool 10 can properly function.

Figure 10:
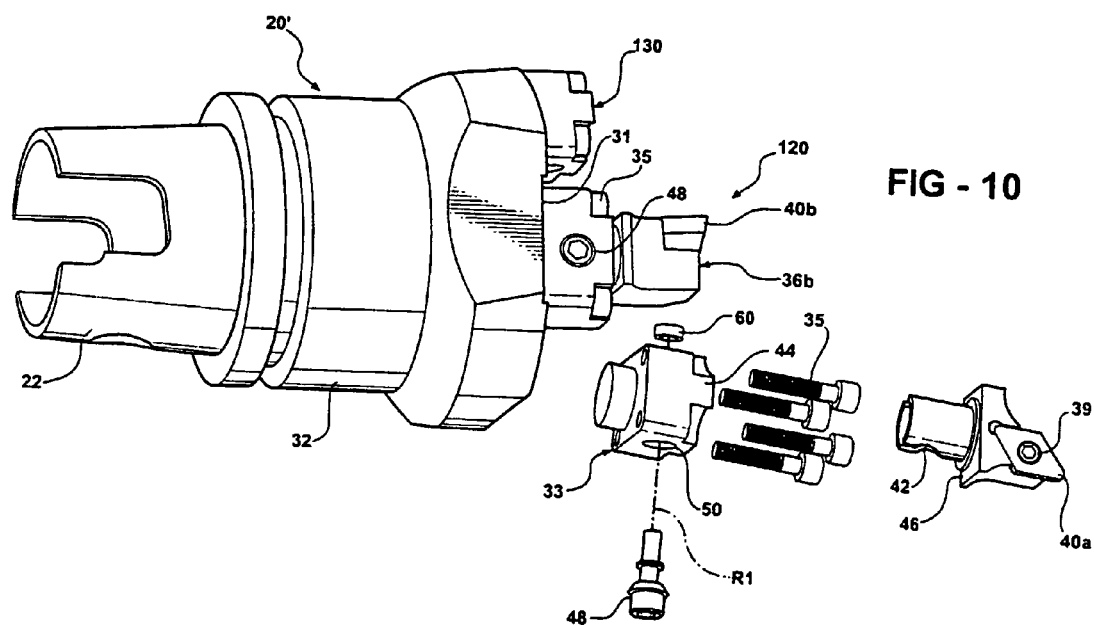
FIG. 10 shows a perspective view of a toolholder according to another embodiment of the invention.
Figure 11:
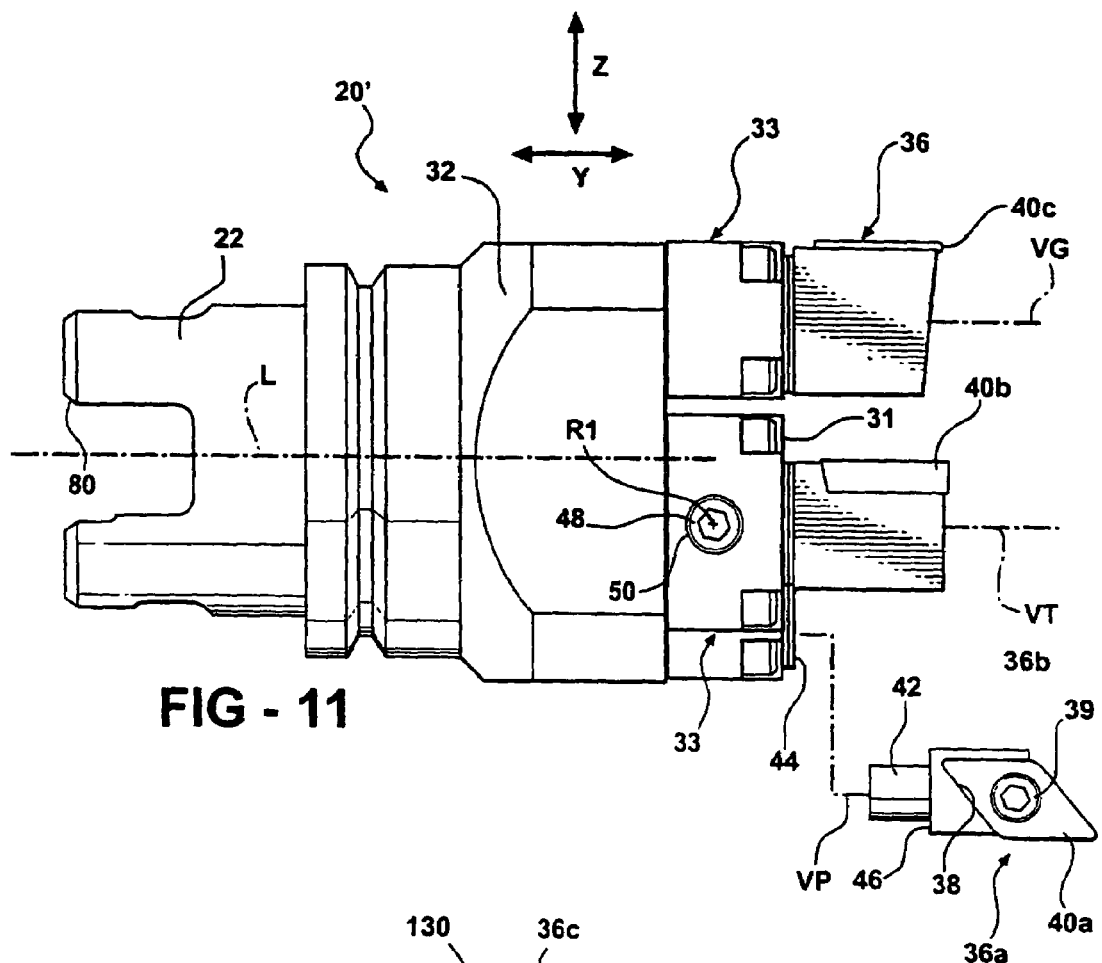
FIG. 11 shows a side view of a toolholder of FIG. 10.
Figure 12:
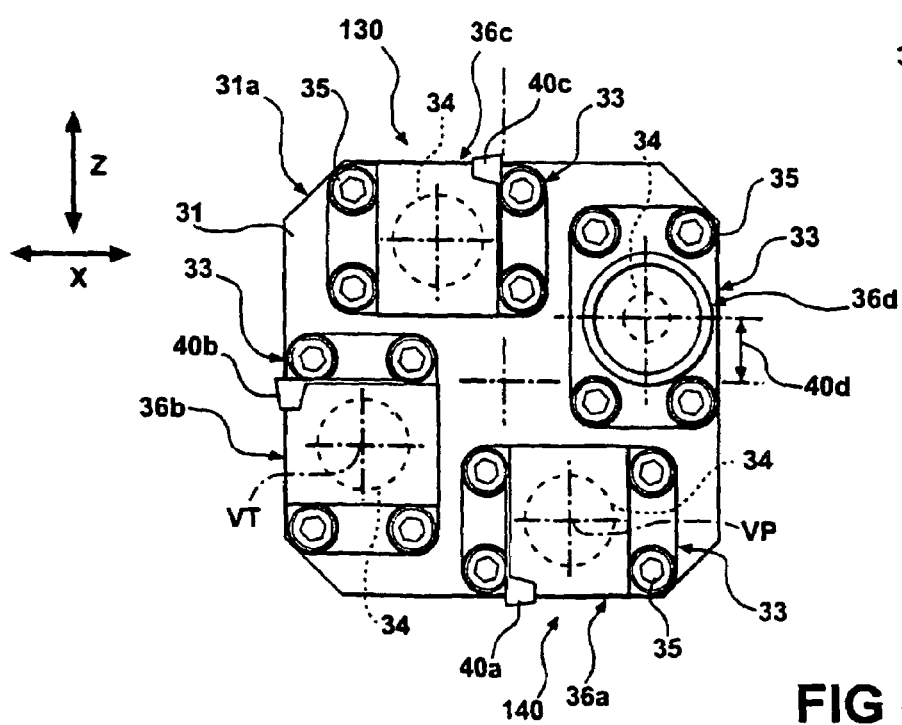
FIG. 12 shows an end view of the toolholder of FIG. 10.

Referring now to FIGS. 10-12, the toolholder 20' is shown according to another embodiment of the invention. Similar to the toolholder 20, the toolholder 20' includes a body portion 32 with one or more support member assemblies 33 removably mounted thereon. The support member assemblies 33 can be removably mounted to an end surface 31 of the body portion 32 by utilizing any suitable fastening means 35, such as screws, bolts, or the like. The end surface 31 may includes chamfered corners 31a. Each support member assembly 33 includes a bore 34 (shown in phantom in FIG. 12) for receiving an insert-receiving cartridge, shown generally at 36a-d. The support member assemblies 33 can be substantially identical in shape, or they each can be a different shape. The bores 34 extend horizontally outward and are substantially parallel to a longitudinal axis, L, which extends along the Y-axis of the toolholder 20'.

In the illustrated embodiment, the toolholder 20' includes a total of four support member assemblies 33 horizontally mounted on the end surface 31 of the body portion 32 for receiving a corresponding number of insert-receiving cartridges 36a-d. However, it will be appreciated that the invention is not limited by the number of support member assemblies 33 and insert-receiving cartridges 36a-d, and that the invention can be practiced with any desirable number of supporting elements and insert-receiving cartridges, with the only limitation being the dimensions of the body portion 32 of the toolholder 20'. Each insert-receiving cartridge 36a-d includes a pocket 38 for securely holding an insert 40a-d to its respective insert-receiving cartridge 36a-d by a suitable fastening means 39, such as a threaded fastener.

Similar to the toolholder 20, the toolholder 20' is capable of providing a quick change feature for a wide variety of cutting tools, such as the turning tool 120 comprising the combination of the cutting insert 40b and the insert-receiving cartridge 36b, the grooving tool 130 comprising the combination of the cutting insert 40c and the insert-receiving cartridge 36c, and the profiling tool 140 comprising a combination of the cutting insert 40a mounted on the insert-receiving cartridge 36a. In accordance with the invention, the tools 120, 130 and 140 are mounted on their respective support member assemblies 33 to allow a quick change of the machine tool, similar to the machine tools mounted on the toolholder 20 of the invention. It should be noted that in the illustrated embodiment, the toolholder 20' includes an odd number of tools 120, 130 and 140, but the toolholder 20' may include an even number of tools. The use of an odd number of tools, for example three, five, and the like, creates clearance between the workpiece and the tools not is use.

Because the tools 120, 130 and 140 are horizontally mounted on the end surface 31 of the body portion 32, rather than radially mounted as in the toolholder 20, the vertical axes, VT, of the turning tool 120 is substantially parallel to the horizontal axis, L, of the toolholder 20', and thus is substantially perpendicular to the vertical axis, V, of the workpiece during turning operations, as shown in FIG. 11. Likewise, the vertical axis, VG, of the grooving tool 130, and the vertical axis, VP (FIG. 12), of the profiling tool 140 are substantially parallel to the horizontal axis, L, of the toolholder 20', and thus is substantially perpendicular to the vertical axis, V, of the workpiece during grooving and profiling operations, respectively.

It should also be noted that the direction of cut of the toolholder 20' is along the X-axis and the Z-axis, rather than along the Y-axis as in the toolholder 20. In addition, the application of an odd number of tools in the toolholder 20' provides diametrical clearance with the workpiece.

Figure 13:
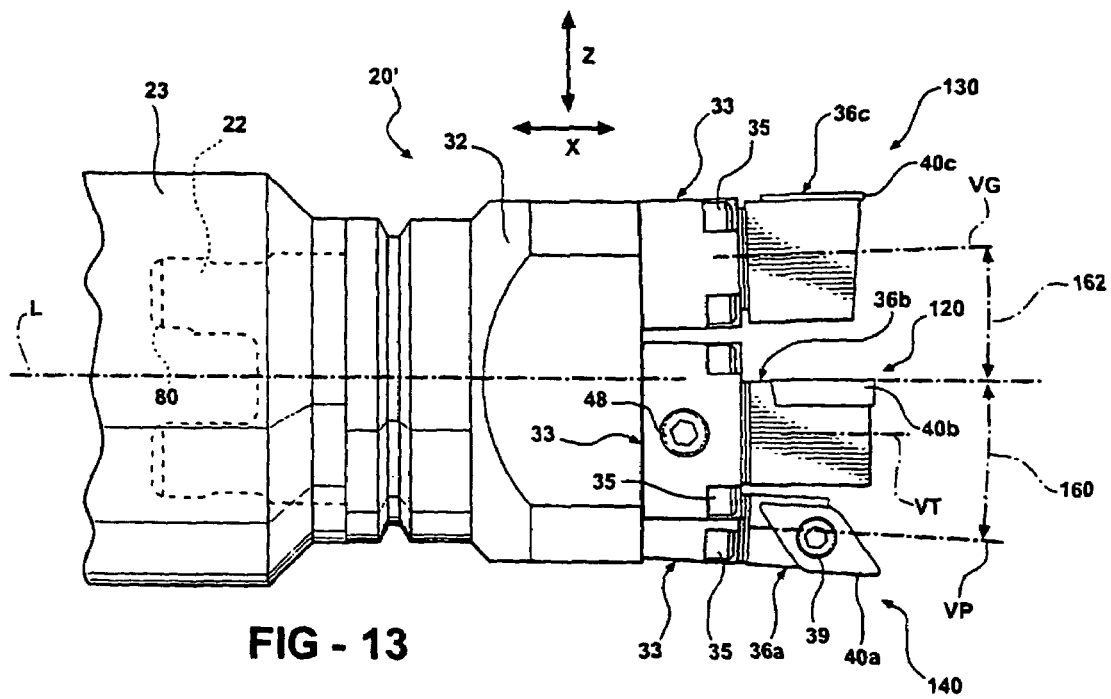
FIG. 13 shows a side view of a toolholder according to an alternate embodiment of the toolholder of FIG. 10 in which some of the cutting tools are canted with respect to the longitudinal axis of the toolholder.
Figure 14:
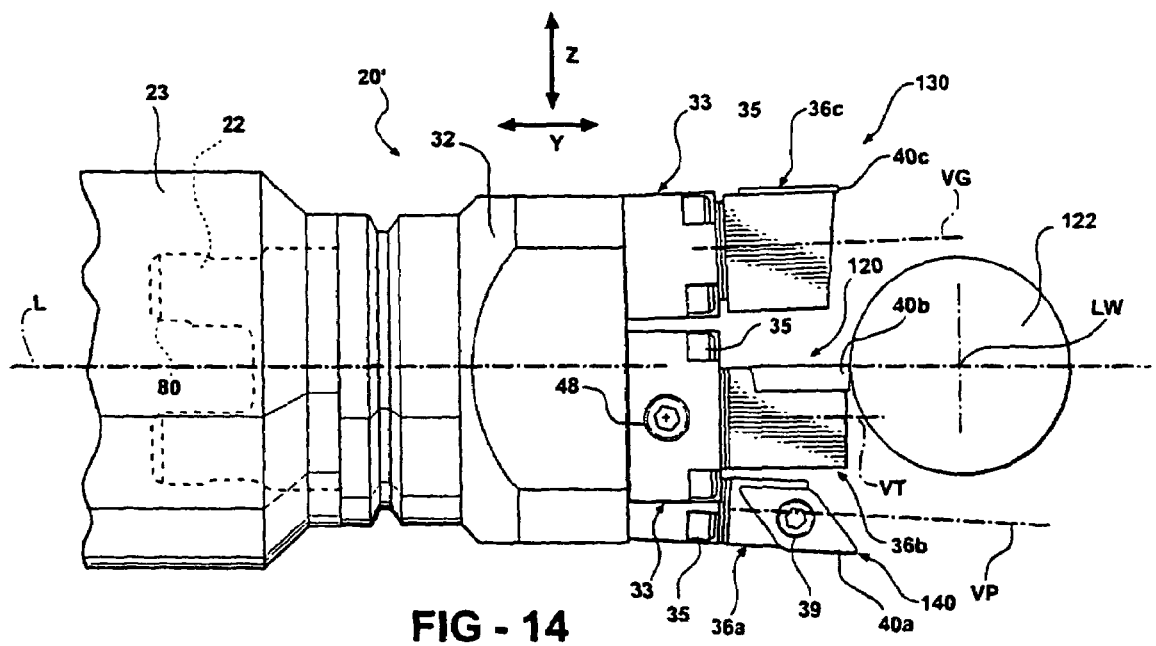
FIG. 14 shows a side view of the toolholder of FIG. 10 performing a turning operation.

Referring now to FIGS. 13 and 14, another example of a toolholder 20' is shown according to the invention. In this example, the vertical axis, VP, of the profiling tool 140 is canted outwardly at an angle 160 in the range of about 0 degrees to about 10 degrees with respect to the longitudinal axis, L, of the toolholder 20'. In addition, vertical axis, VG, of the grooving tool 130, is also canted outwardly at an angle 162 in the range of about 0 degrees to about 10 degrees with respect to the longitudinal axis, L, of the toolholder 20'. The canting of the tools 130, 140 provide clearance for the tools on the reverse side of the toolholder 20', especially during turning operations. It should be noted that the vertical axis, VT, for the turning tool 120 is not canted and is substantially parallel to the longitudinal axis, L. It will be appreciated that the angle at which each tool 120, 130 and 140 is canted may be separate and distinct from each other.

As shown in FIG. 14, the vertical axis, VT, of the turning tool 120 is substantially parallel to the horizontal axis, L, of the toolholder 20, and thus is substantially parallel to the horizontal axis, LW, (into the page) of the workpiece 122, but in a different plane, when the turning tool 120 is engaging the workpiece 122 during turning operations. It should be noted that the horizontal axis, L, of the toolholder 20' is in the same plane as the horizontal axis, LW, of the workpiece 122. Thus, the cutting edge of the insert 40b properly lies along the horizontal axis, LW, and centerline of the workpiece 122. It should also be noted that the direction of cut (toward the view) is along the Z-axis and is substantially parallel to both the horizontal axis, LW, of the workpiece 122 and the horizontal axis, L, of the toolholder 20'. As seen in FIG. 14, the canting of the tools 130, 140 provide clearance for the tools on the reverse side of the toolholder 20', especially during turning operations.

Figure 15:
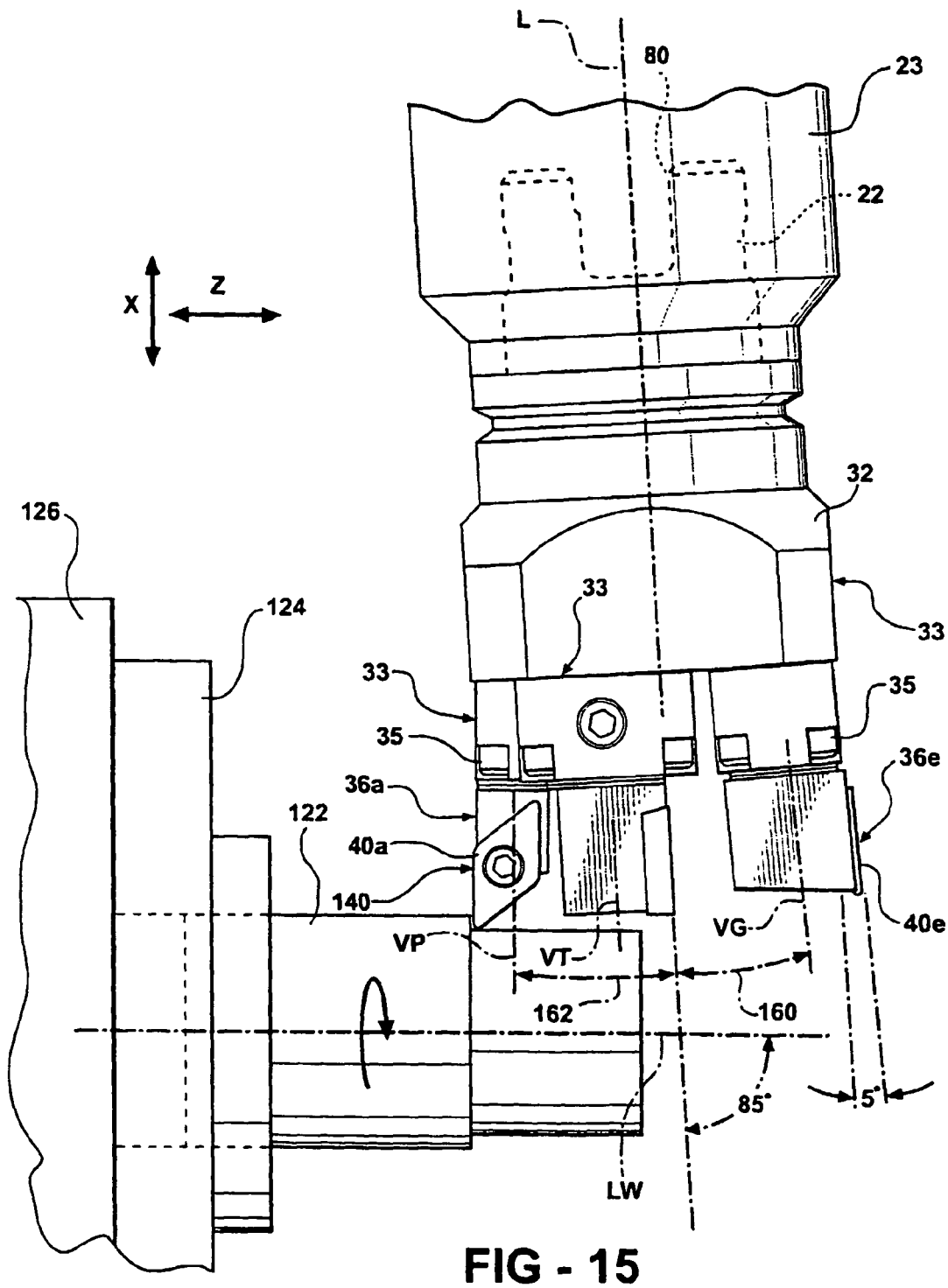
FIG. 15 shows a side view of the toolholder of FIG. 10 performing a profiling operation.

In the profiling operation shown in FIG. 15, the workpiece 122 has a longitudinal axis, LW, along its centerline that is substantially perpendicular to a horizontal axis, L, in the direction of the X-axis of the toolholder 20' when the toolholder 20' is engaging the workpiece 122 during profiling operations. As can be seen in FIG. 15, the canting of the tools 130, 140 provide clearance for the tool 130 on the reverse side of the toolholder 20', even during profiling operations.

Figure 16:
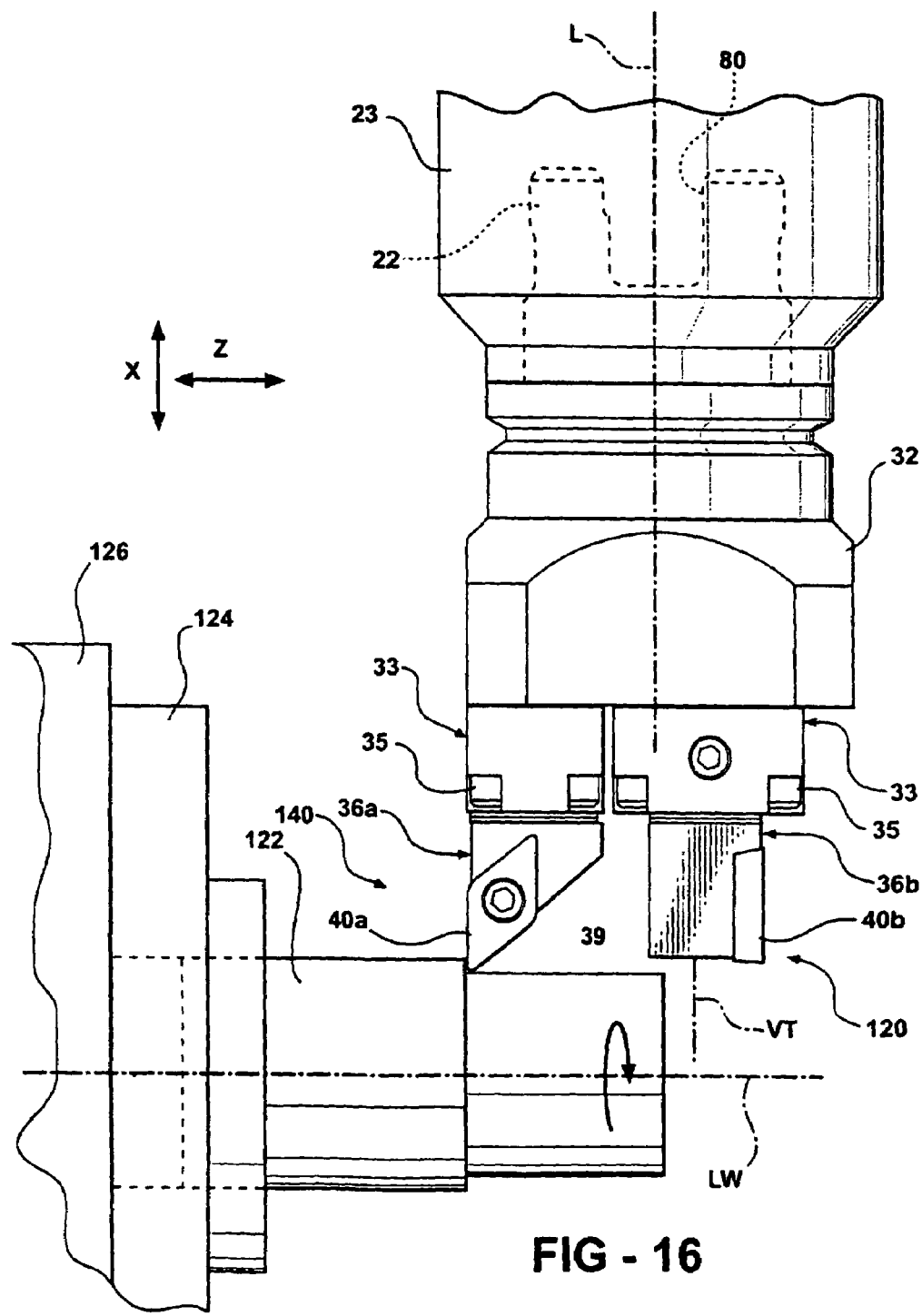
FIG. 16 shows a side view of the toolholder with an odd number of cutting inserts performing a profiling operation according to an alternate embodiment of the invention.

As mentioned above, the toolholder 20, 20' of the invention is not limited by the number of cutting inserts that can be mounted to its respective support member. As shown in FIG. 16, for example, the toolholder 20 includes three support member assemblies 33 (only two are visible in FIG. 16) and a respective number of insert-receiving cartridges and cutting inserts. It has been found that the configuration of an odd number, for example, three, five, seven, etc. support member assemblies 33 provides clearance for the tool 120, 130, 140 not being used. As shown in FIG. 16, the tools 130, 140 have adequate clearance when the profiling tool 120 is being used in the profiling operation.

As described above, the toolholder 20, 20' of the invention provides a quick change feature that enables the insert-receiving cartridges with cutting inserts to be quickly mounted to or removed from their respective support member assemblies. This feature reduces the cost associated with conventional toolholders in which the entire cartridge needs to be replaced when worn or damaged. In addition, this feature reduces downtime when the insert becomes worn or damaged by enabling the insert-receiving cartridge and respective insert to be quickly removed and/or installed during machine operations.

Referring to FIGS. 17-22, there is shown a toolholder 20 capable of being fixed in a plurality of static positions during a machining operation of a rotating workpiece. The toolholder 20 includes a body portion 32 having a plurality of pockets 38. Retained within each pocket 38 is a cutting insert 40. The toolholder 20 moves between fixed static positions by rotation and translation at least in an axis perpendicular to a normal cutting plane (Y-axis) of the machine tool to individually present each cutting insert 40 to the rotating workpiece during the machining operation.

Figure 17:
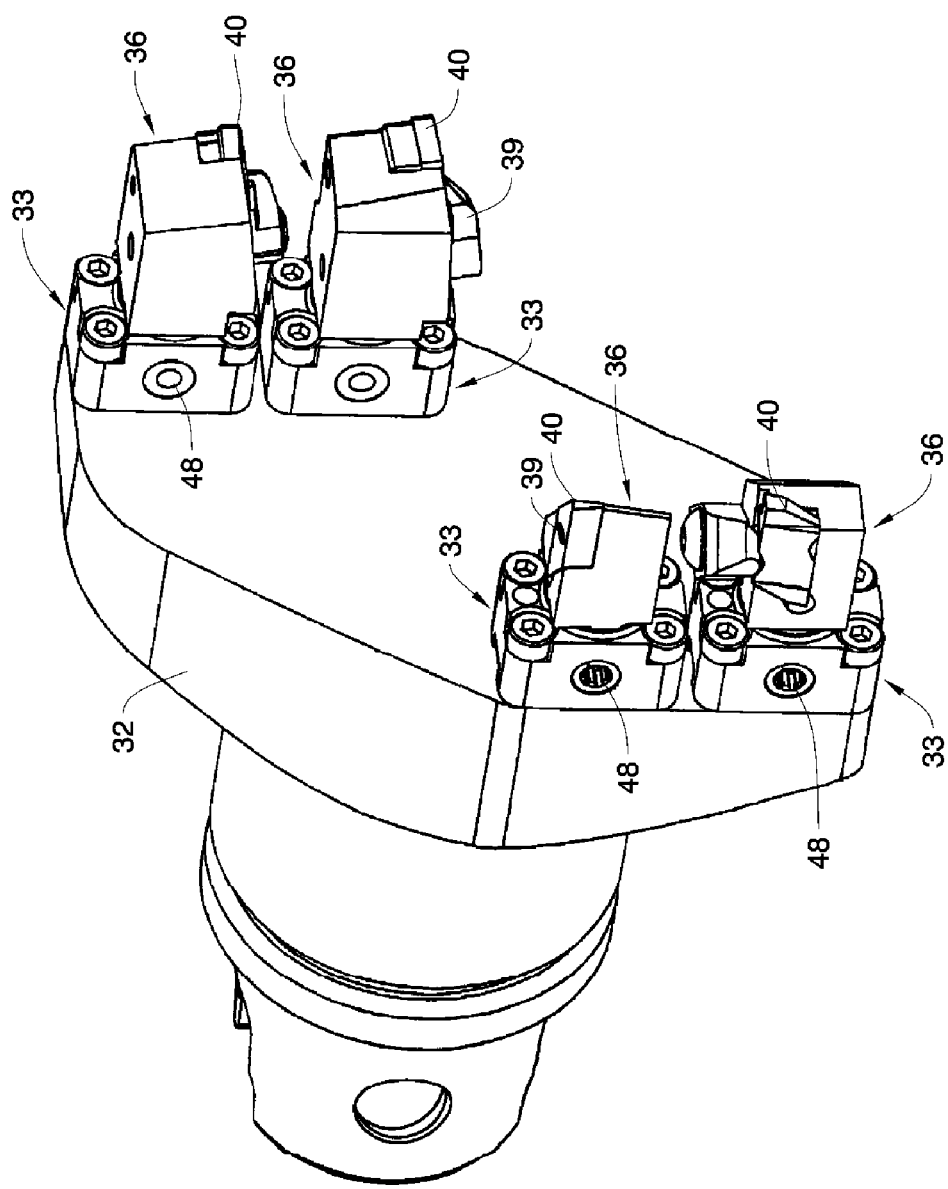
FIG. 17 shows a perspective view of a toolholder according to an alternate embodiment of the invention
Figure 18:
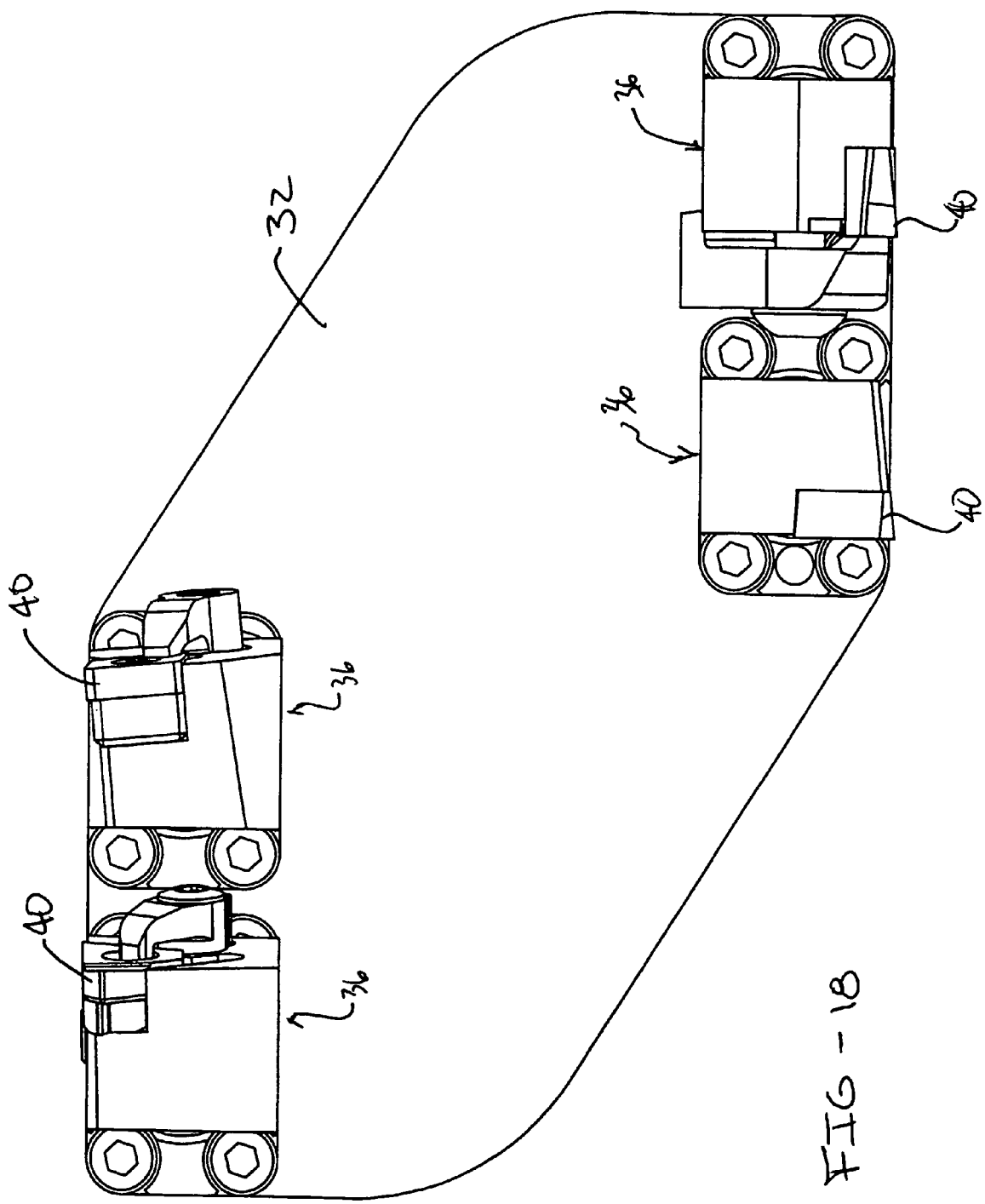
FIG. 18 shows a front view of the toolholder of FIG. 17.
Figure 19:
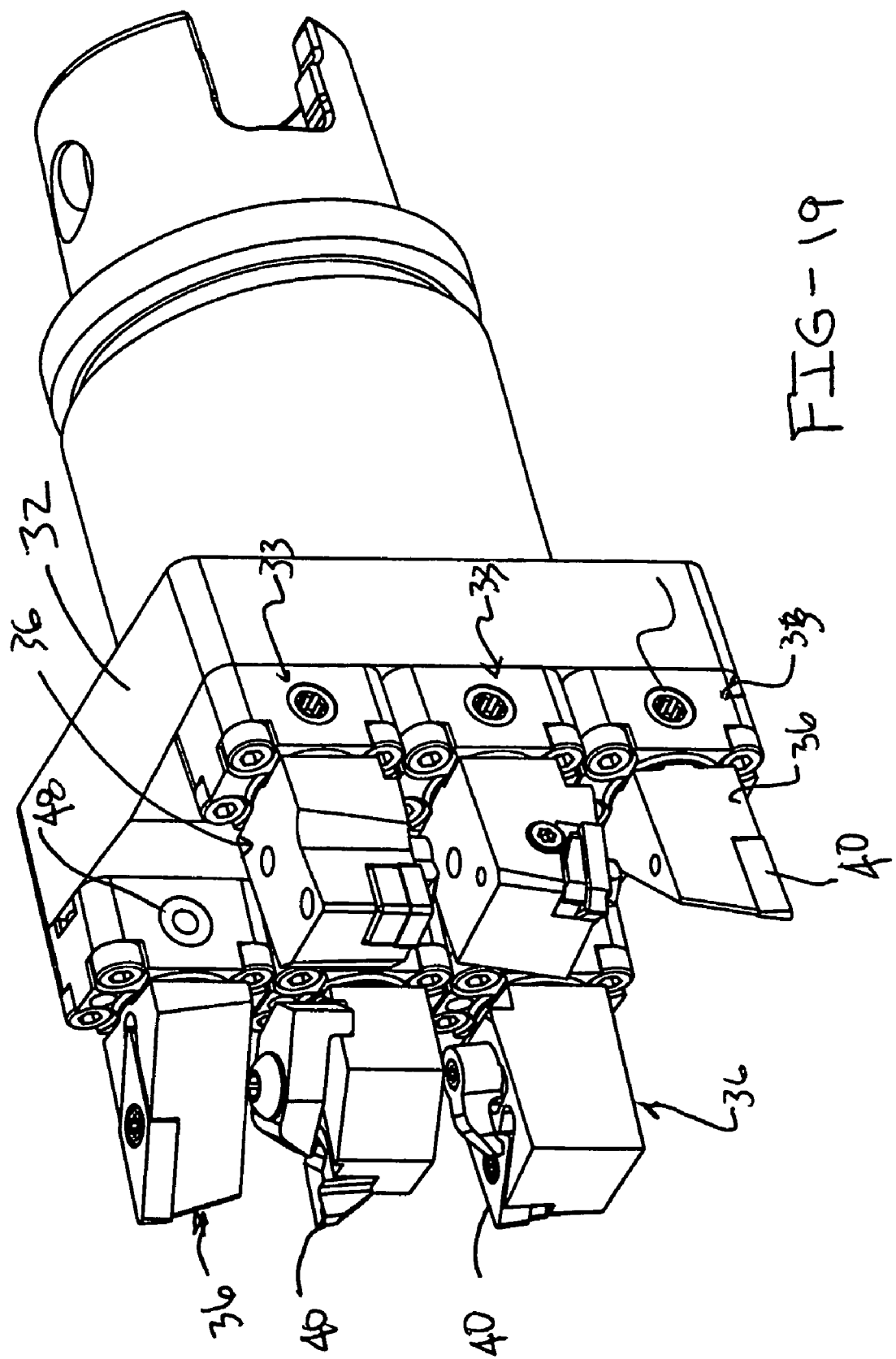
FIG. 19 shows a perspective view of a toolholder according to an alternate embodiment of the invention.
Figure 20:
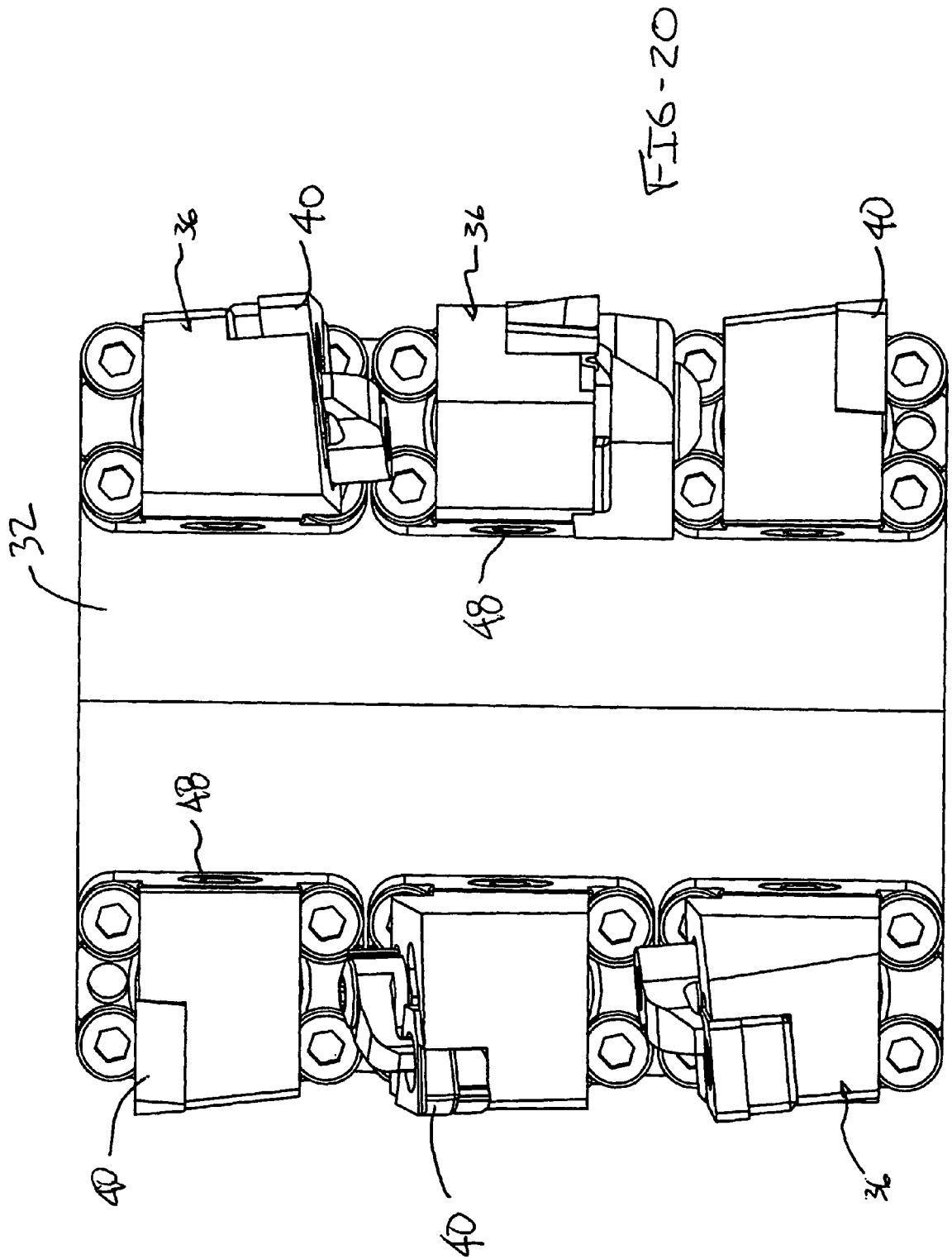
FIG. 20 shows a front view of the toolholder of FIG. 19.

Referring to FIGS. 17 and 18, there is shown a toolholder 20 including support member assemblies 33 located in two orientations 180 degrees apart. The two support member assemblies 33 are located equidistant from the cutting plane but 180 degrees apart from one another. The other support member assemblies 33 are arranged so that the cutting tools and inserts 40 are above and below the first two support member assemblies. To access these inserts 40, Y axis motion is necessary as well as a 180 degree index of the spindle to access the other side of the toolholder 20.

The toolholder 20 shown in FIGS. 17 and 18 is particularly useful for those machining applications where the distance between storage receptacles of a type well known in the art is small. The receptacle pattern can be relatively narrow in one dimension. This allows for clearance in tool chain type storage magazines. The toolholder 20 can be presented to the work piece in either a perpendicular or canted orientation. The toolholder 20 is also particularly useful for those machines that only have 180 degree orientation of the primary spindle.

Figure 24:
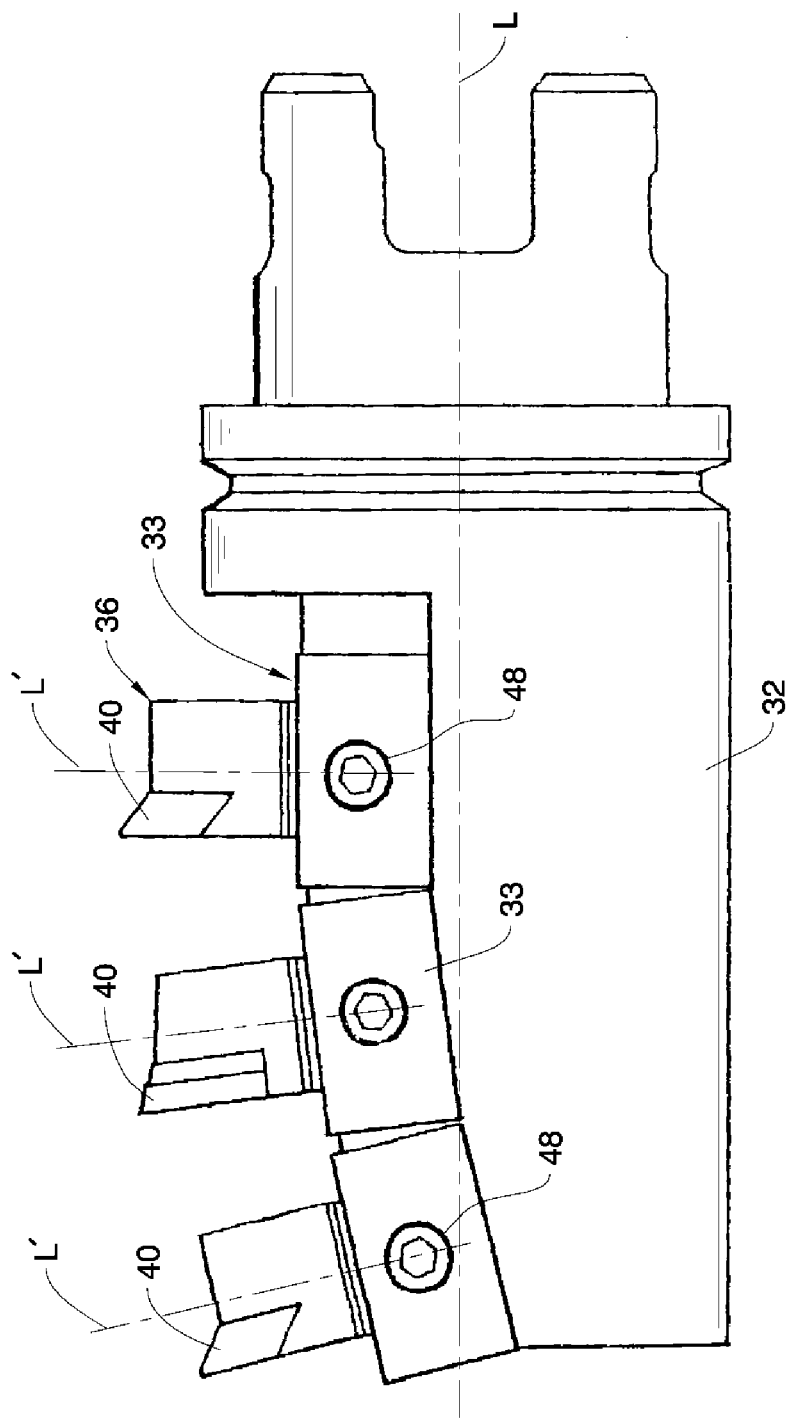
FIG. 24 shows a perspective view of a toolholder according to an alternate embodiment of the invention.
Figures 25, 26:
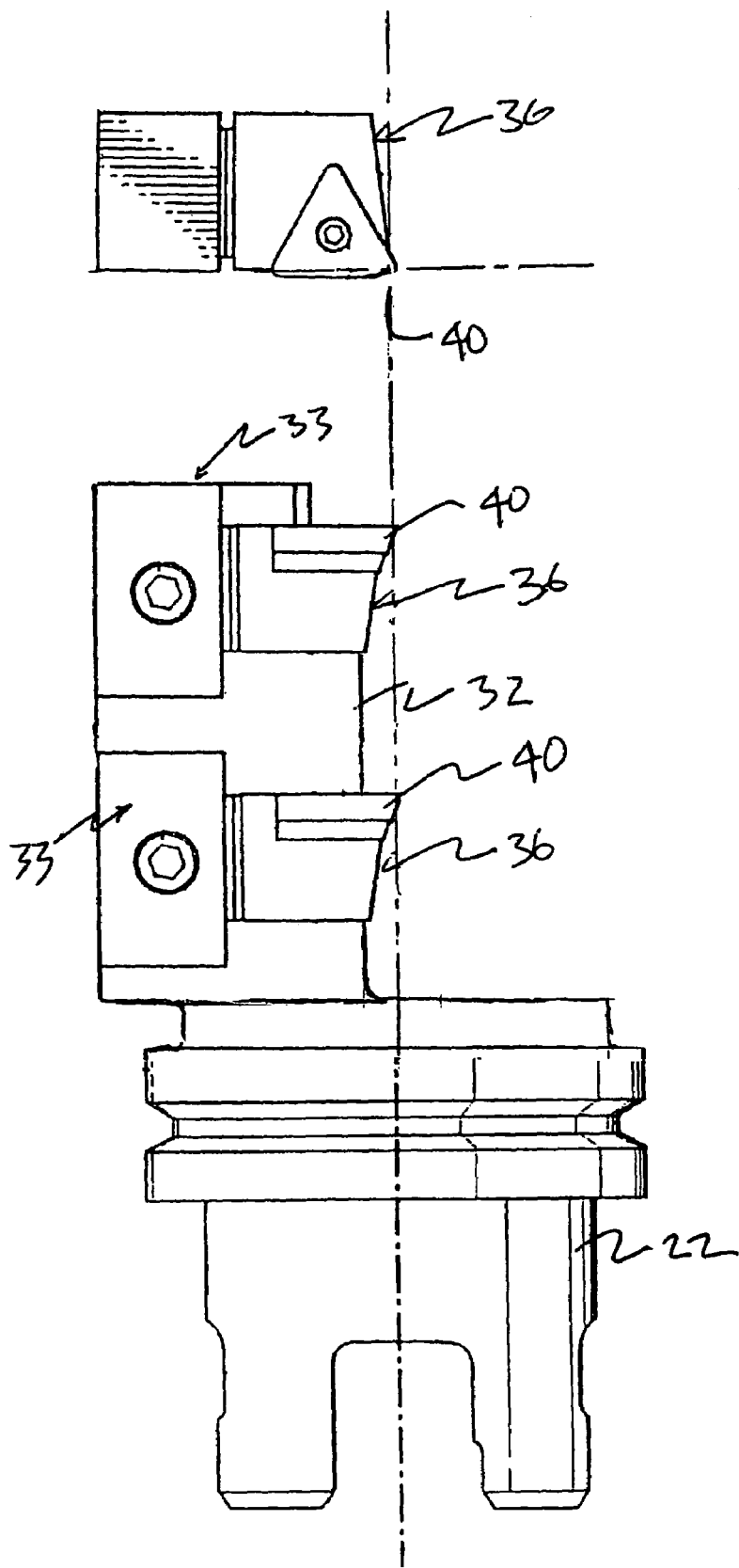
FIG. 25 shows a perspective view of a toolholder according to an alternate embodiment of the invention.
FIG. 26 shows a top view of the toolholder of FIG. 25.

As shown in FIG. 24, the toolholder 20 may include a plurality of cartridges 36 positioned such that the longitudinal axis L' of the cartridges are nonparallel. It will be appreciated that by arranging the longitudinal axes if the cartridges 36 as shown the spacing between the respective cutting edges may be increased thereby increasing the number of cutting tools per body portion 33.

The documents, patents and patent applications referred to herein are hereby incorporated by reference.

While the invention has been specifically described in connection with various embodiments thereof, it is to be understood that this is by way of illustration and not of limitation, and the scope of the appended claims should be construed as broadly as the prior art will permit.

What is claimed is:

1. A toolholder, comprising:
   a body portion;
   a support member mounted to the body portion, the support member including a bore; and
   an insert-receiving cartridge including a shank removably received in the bore of passing through the shank the support member by an actuator bolt, the insert-receiving cartridge including a pocket for receiving a cutting insert,
   wherein rotation of the actuator bolt causes the insert-receiving cartridge to be secured to or removed from the support member.

2. The toolholder according to claim 1, wherein the support member is radially mounted on the body portion.

3. The toolholder according to claim 1, wherein the support member is horizontally mounted on the body portion.

4. The toolholder according to claim 1, wherein the toolholder further comprises a plurality of support members and a corresponding number of insert-receiving cartridges and cutting inserts.

5. The toolholder according to claim 4, wherein a first cutting tool is formed by one of the plurality of cutting inserts mounted on one of the plurality of insert-receiving cartridges, and
   wherein a second cutting tool is formed by a different one of the plurality of cutting inserts mounted on a different one of the plurality of insert-receiving cartridges.

6. The toolholder according to claim 5, wherein the cutting tool is one of a turning tool, a grooving tool, and a profiling tool.

7. The toolholder according to claim 5, wherein second cutting tool engages a workpiece by rotating the toolholder about a longitudinal axis of the toolholder to a fixed position.

8. A toolholder, comprising:
   a body portion;
   a plurality of support members mounted to the body portion, each support member including a bore; and
   a plurality of insert-receiving cartridges, each insert-receiving cartridge including a pocket and a shank removably received in the bore of the support member, by an actuator bolt passing through the shank each insert-receiving cartridge including a pocket,
   wherein a first cutting tool is formed by one of the plurality of cutting inserts mounted on one of the plurality of insert-receiving cartridges, the first cutting tool engaging a workpiece, and
   wherein a second cutting tool is formed by a different one of the plurality of cutting inserts mounted on a different one of the plurality of insert-receiving cartridges, and
   wherein the second cutting tool is capable of engaging the workpiece by rotating the toolholder about a longitudinal axis of the toolholder to a fixed position.

9. The toolholder according to claim 8, wherein rotation of the actuator bolt causes the insert-receiving cartridge to be secured to or removed from the support member.

10. The toolholder according to claim 8, wherein the support member is radially mounted to the body portion.

11. The toolholder according to claim 8, wherein the support member is horizontally mounted on the body portion.

12. The toolholder according to claim 8, wherein the first cutting tool is one of a turning tool, a grooving tool, and a profiling tool.

13. A machine tool, comprising:
    a shank and a shank jaw; and
    a toolholder rotatably mounted in the shank jaw, the toolholder comprising:
      a body portion;
      a plurality of support members mounted to the body portion, each support member including a bore; and
      a plurality of insert-receiving cartridges, each insert-receiving cartridge including a pocket and a shank removably received in the bore of the support member, by an actuator bolt passing through the shank each insert-receiving cartridge including a pocket,
    wherein a first cutting tool is formed by one of the plurality of cutting inserts mounted on one of the plurality of insert-receiving cartridges, the first cutting tool engaging a workpiece, and
    wherein a second cutting tool is formed by a different one of the plurality of cutting inserts mounted on a different one of the plurality of insert-receiving cartridges, and
    wherein the second cutting tool is capable of engaging the workpiece by rotating the toolholder about a longitudinal axis of the toolholder to a fixed position.

14. The machine tool according to claim 13, wherein rotation of the actuator bolt causes the insert-receiving cartridge to be secured to or removed from the support member.

15. The machine tool according to claim 13, wherein the support member is radially mounted on the body portion.

16. The machine tool according to claim 13, wherein the support member is horizontally mounted on the body portion.

17. The machine tool according to claim 13, wherein the first cutting tool is one of a turning tool, a grooving tool, and a profiling tool.

18. The toolholder according to claim 1,
    wherein the toolholder moves between fixed static positions by rotation and translation at least in an axis perpendicular to a normal cutting plane (Y-axis) of the machine tool.

* * * * *